M. GALLY.
Telegraphic Apparatus and Circuits.

No. 158,928. Patented Jan. 19, 1875.

WITNESSES.
John Thomson
T. F. Quimby

INVENTOR.
Merritt Gally

UNITED STATES PATENT OFFICE.

MERRITT GALLY, OF ROCHESTER, NEW YORK.

IMPROVEMENT IN TELEGRAPHIC APPARATUS AND CIRCUITS.

Specification forming part of Letters Patent No. 158,928, dated January 19, 1875; application filed January 13, 1875.

*To all whom it may concern:*

Be it known that I, MERRITT GALLY, of Rochester, in Monroe county and State of New York, have invented certain new and useful Improvements in Telegraphic Apparatus; and I do hereby declare that the following is a full and exact description thereof, reference being had to the accompanying drawings, and to the letters of reference marked thereon.

Figure 1:
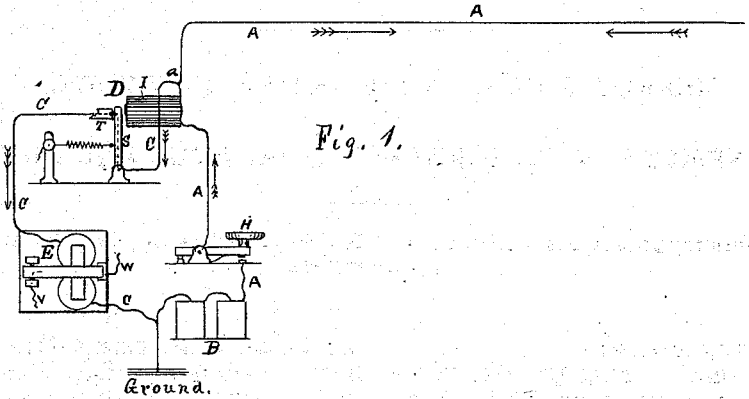
Figure 2:
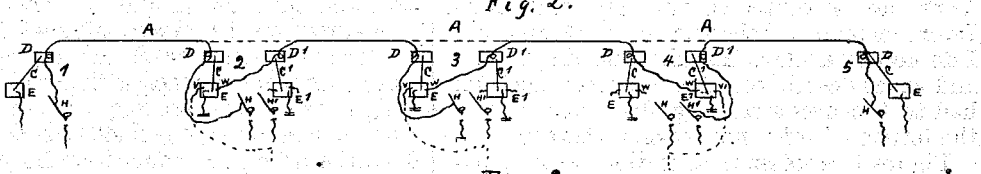
Figure 3:
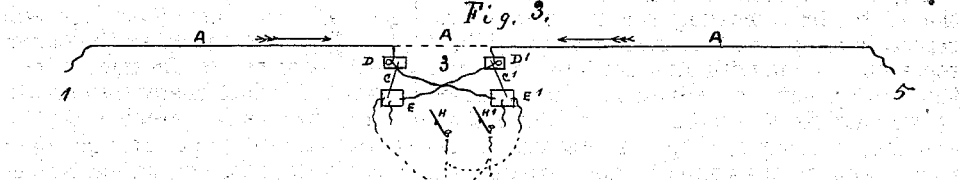
Figure 4:
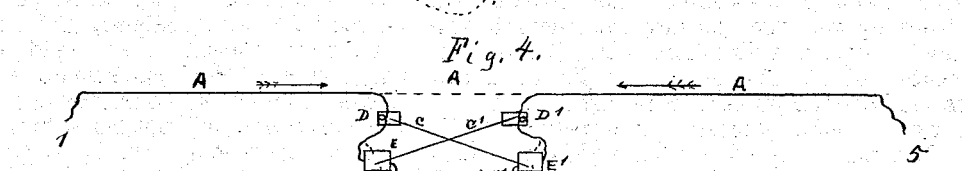
Figure 5:
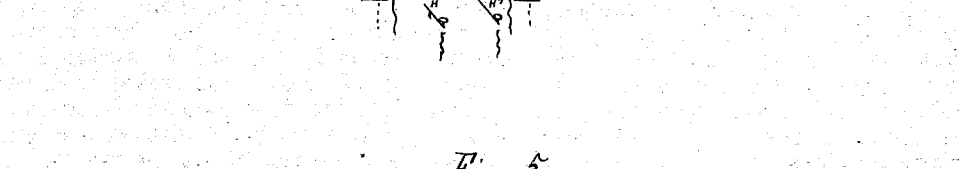

Figure 1 represents a station with a portion of the line, showing the transmitter, receiver, battery, and automatic switch. Fig. 2 represents a line with five stations, showing the arrangement of instruments and courses of currents for a number of communications and drop messages. Fig. 3 represents the arrangement of instruments and circuits for dropping messages passing intermediate stations in opposite directions. Fig. 4 is a modification of the arrangement of Fig. 3. Fig. 5 is the key-manipulator, constructed so that it may be used as a receiver or repeater.

The usual method of transmitting messages in opposite directions simultaneously upon a single wire, without the employment of intervals, has been by the use of divided currents, double batteries, and resistance-coils, not only adding much to the expense of apparatus, but to the consumption of unnecessary battery-power, besides requiring great care in adjustment, and the balancing of batteries.

The object of my invention is, first, to produce simple apparatus, easily adjusted, and not necessitating the use of resistance-coils, double batteries, or divided currents; and, secondly, to allow intermediate offices to be transmitting different messages without interrupting a through-message passing in an opposite direction; thirdly, to allow messages to lap by or overreach each other without conflict; fourthly, to allow either or both of the messages passing in opposite directions to be dropped at any number of or at all the intermediate stations; and, fifthly, to so construct the manipulator as to make it available either as transmitter, receiver, or repeater.

In Fig. 1, A represents the main line; B, the battery; H, the transmitter; and E, the receiver or relay, as the case may be. These are the usual instruments for a common single line. In addition to these I use an automatic tripping-switch, D, which operates in connection with the local circuit C. The switch D is operated by the electro-magnet I. Either the switch-connector S or the core of the magnet is made of steel, with permanent magnetism or both, where required, of soft iron. Now, if a receiver be placed in a line at a distant station, and connection be made with ground in the usual manner, when the manipulator H is operated the current will pass from battery B to main line A through magnet I, which instantly attracts switch-bar S and breaks the circuit C at T, causing the entire current to go through the main line to the distant receiver, which is operated by the current. Now, considering the instrument of the distant station as arranged precisely in the manner of the home station, we follow the current as follows: Arriving at the switch D, the connection at T not being broken, the current passes through the local and receiver. If the home and distant key be both struck simultaneously, the currents are opposed in the main line, and the switch S not being affected, each current takes its respective course through its local C and receiver. The receiver E is furnished with connections V and W, in order that it may be used as a relay or a repeater.

In Fig. 2 a line is shown with five stations, each of the stations intermediate between the extremes 1 and 5 being furnished with two sets of instruments, the circuits of which may be crossed from side to side, as shown, in order that messages passing in either or both directions may be either dropped at any station or stations, or either one or both passed on, as desired. At stations 2 and 3 the main line is switched from key H' to the connectors W of the receivers E, and in station 4 the line is switched from key H to connector W' of receiver E'. At stations 2 and 3 the connectors V of receivers E are switched onto the batteries of keys H', and at station 4 the connector V' is switched onto battery of key H.

If we follow the circuit it will be seen that a message from key H, station 1, passes to E, station 2; from thence, through D', to station 3; from thence to F, station 4, where it stops. From key H, station 2, a message passes to station 1; from key H, station 3, a message passes to E', station 2; from key H, station 5, a message passes to E', station 3; and from key H', station 4, a message passes to E, station 5.

In Fig. 3 the line is switched crosswise from D to E', and from D' to E. A message passing from 1 to 5, and another from 5 to 1, may, in this manner, be both dropped at any or all intermediate stations. In Fig. 3 the battery-lines are also crossed. Fig. 4 shows the local crossed from side to side, instead of the line and battery wires, for the same purpose as Fig. 3.

If an operator at one of the keys at a station wishes to receive a message from both directions simultaneously, or receive one and repeat another, the key is constructed as shown in Fig. 5. The lever of the key H is provided with an armature, n, and magnets J. As he is not using his key, it may now be used as receiver or repeater, and the message coming in through C C is repeated through A A. To break the connection at T, Fig. 1, the magnet may be made to act upon the armature S by repulsion instead of attraction, if desired. In such case, however, the connection T must be placed on the opposite side of armature S.

The key H represents a connector for passing pulsations through the line, and may be substituted by any style of connector, operated either by hand or automatically. I do not therefore wish to confine myself to a simple key or any particular kind of connector for such purposes, in connection with the other parts of my invention. Unless the batteries at two communicating stations are at very great variance, it is not necessary that the connector S be polarized. It may, however, sometimes be desirable in cases of very great variation in batteries, or where certain instruments are used for secret messages.

The connection of the line A with circuit C, at a, is made on the opposite side of magnet I from that occupied by the battery connection. This is to make the passage of the current from battery certain to pass through magnets I before it can reach circuit C.

Messages in either direction are made to pass a station, if not to be dropped, by simply breaking the connection of circuit C from ground.

What I claim as my invention, and desire to secure by Letters Patent, is—

1. The combination, with the telegraphic line A, of the circuit C, with a receiver, a relay, or a repeater, E, and automatic switch for operating the connection between the line A and circuit C, substantially as and for the purpose specified.

2. The combination of the circuit C and a battery, with and connected to the main line on opposite sides of the magnet I, substantially as and for the purposes specified.

3. The combination of the line A and double sets of station instruments, with circuits crossed from side to side in either or both directions, substantially as and for the purposes specified.

4. The combined manipulating-key, and receiver, relay, or repeater, consisting of a magnet-armature, and key-lever, substantially as specified.

MERRITT GALLY.

Witnesses:
JNO. THOMSON,
E. DE WITT THOMAS.